No. 782,041. PATENTED FEB. 7, 1905.
B. J. MULLEN.
GAS WASHER.
APPLICATION FILED JUNE 17, 1904.
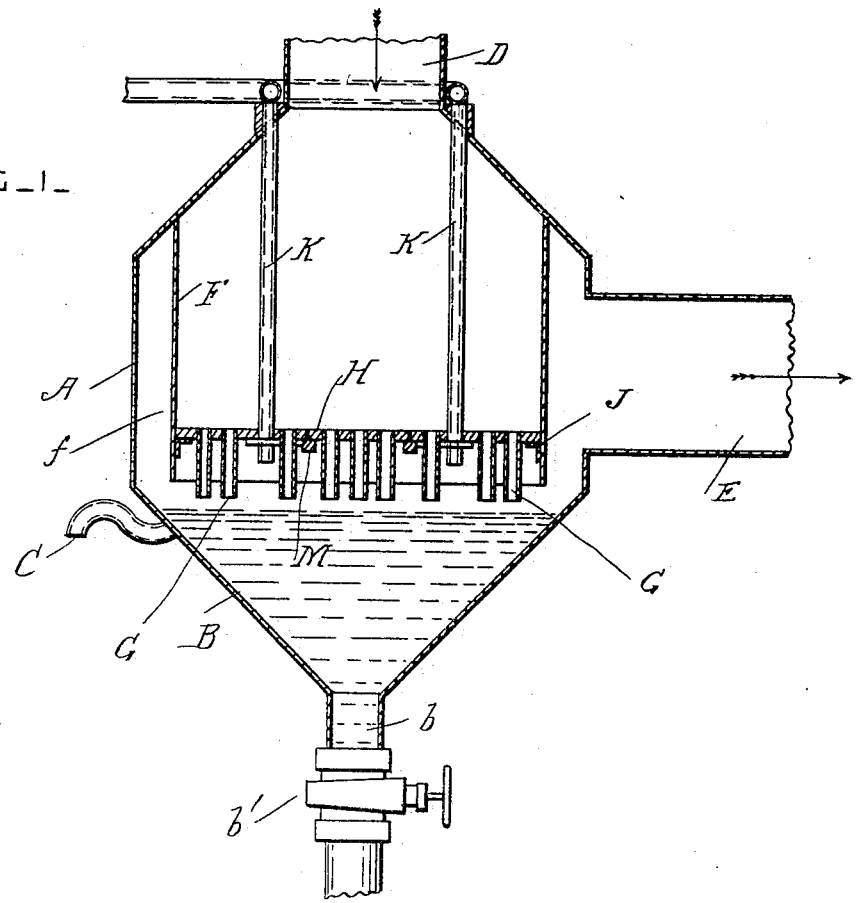
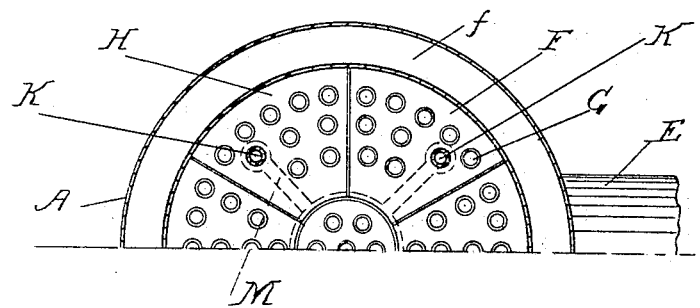
WITNESSES:
L. B. Middleton
Walter Donaldson
INVENTOR
Benjamin J. Mullen.
BY Herbert W. Jenner.
Attorney No. 782,041. Patented February 7, 1905.

UNITED STATES PATENT OFFICE.

BENJAMIN J. MULLEN, OF LEETONIA, OHIO.

GAS-WASHER.

SPECIFICATION forming part of Letters Patent No. 782,041, dated February 7, 1905.

Application filed June 17, 1904. Serial No. 212,973.

*To all whom it may concern:*

Be it known that I, BENJAMIN J. MULLEN, a citizen of the United States, residing at Leetonia, in the county of Columbiana and State of Ohio, have invented certain new and useful Improvements in Gas-Washers; and I do hereby declare the following to be a full, clear, and exact description of the invention, such as will enable others skilled in the art to which it appertains to make and use the same.

This invention relates to gas-washers for use in connection with blast-furnaces; and it consists in the novel construction and combination of the parts hereinafter fully described and claimed.

In the drawings, Figure 1 is a vertical section through the gas-washer. Fig. 2 is a partial sectional plan view of the same.

The washing of the gas is effected in a large vessel A. The lower part B of this vessel contains water, and $b$ is the outlet-pipe at the bottom of the vessel, through which the water and dirt are removed periodically. This pipe is provided with any suitable valve $b'$.

C is an overflow-pipe and water seal arranged at about the level of the water in the washer.

The washer may be of any approved shape, and its middle part is preferably cylindrical and its top and bottom portions conical; but it may be of any other convenient shape.

D is the inlet-pipe for the gas, which is connected to the top part of the washer and which conducts the gas into it from the blast-furnace.

E is the outlet-pipe for the gas after being washed. This pipe E is connected to the side of the vessel A and conducts the washed gas to the boiler or stoves, where it is used in the usual way.

F is a gas-chamber which depends from the upper part of the vessel to a short distance above the water-level, thereby forming an annular chamber $f$ for the washed gas. The lower part of the gas-chamber F is divided into a series of smaller gas-chambers G, and the gas is brought in contact with the surface of the water as it issues from these small chambers G. The small chambers G consist of short open-ended pipes which are secured into a head at the lower part of the gas-chamber F. The head is preferably formed of plates H, which are supported in any approved manner.

J is an angle-iron on the gas-chamber for supporting the outer portions of the plates, and K represents pipes which depend from the upper part of the vessel A and which support the middle portions of the plates or head.

M represents intermediate bars which also assist in supporting the plates.

The pipes K afford a means for supplying the lower part of the vessel A with water, and the water which passes through them cools them and prevents them from being destroyed by the hot gas in the upper part of the washer.

The gas which enters the upper part of the washer is divided up into small volumes before being brought in contact with the water, and this subdivision of the gas insures the whole of it coming in contact with the water. The gas impinges on the surface of the water as it passes out of the small chambers or pipes and parts with its dust and other impurities, which are taken up by the water. The clean gas passes between the pipes and under the bottom of the chamber F into the annular chamber $f$ and thence passes out by the pipe E to the boilers or stoves.

What I claim is—

1. In a gas-washer, the combination, with a vessel provided with inlet and outlet openings for gas, and having also an overflow-opening for water; of an inlet gas-chamber in the said vessel, and a multiplicity of dividing chambers or pipes supported at the lower part of the said gas-chamber, said dividing-chambers having open upper ends which communicate with the said gas-inlet opening, and open lower ends arranged above the level of the said water-overflow opening and communicating constantly with the said gas-outlet opening, whereby the gas is divided into small volumes or jets which impinge on the surface of water in the lower part of the said vessel.

2. In a gas-washer, the combination, with a vessel provided with an overflow-opening for water, and having inlet and outlet openings for gas at its top and side respectively; of an inlet gas-chamber depending in the said vessel and forming an annular space for the gas which communicates constantly with the said outlet-opening, and a series of chambers supported at the lower part of the said gas-chamber and having open lower ends arranged above the level of the said overflow-opening, said chambers operating to divide the gas into small volumes which impinge on the surface of water in the lower part of the said vessel.

3. In a gas-washer, the combination, with a vessel provided with an overflow-opening for water, and having inlet and outlet openings for gas at its top and side respectively; of an inlet gas-chamber depending in the said vessel, a head at the lower part of the said gas-chamber, water-inlet supply-pipes which support the said head from the upper part of the said vessel, and a series of chambers suspended from the said head and having open lower ends arranged above the level of the said overflow-opening, said chambers operating to divide the gas into small volumes which impinge on the surface of water in the lower part of the said vessel.

In testimony whereof I have affixed my signature in the presence of two witnesses.

BENJAMIN J. MULLEN.

Witnesses:
JOHN McNAMARA,
JOHN B. MORGAN.